(12) United States Patent
Wang et al.

(10) Patent No.: US 7,927,760 B2
(45) Date of Patent: Apr. 19, 2011

(54) METHODS TO CONTROL WATER FLOW AND DISTRIBUTION IN DIRECT METHANOL FUEL CELLS

(75) Inventors: Chao-Yang Wang, State College, PA (US); Guoqiang Lu, State College, PA (US); Wenpeng Liu, State College, PA (US); Fuqiang Liu, State College, PA (US); Yuusuke Sato, Tokyo (JP); Eiichi Sakaue, Tokyo (JP); Kei Matsuoka, Kawasaki (JP)

(73) Assignees: The Penn State Research Foundation, University Park, PA (US); Kabushiki Kaisha Toshiba, Minato-ku, Tokyo (JP)

( * ) Notice: Subject to any disclaimer, the term of this patent is extended or adjusted under 35 U.S.C. 154(b) by 1273 days.

(21) Appl. No.: 11/013,922

(22) Filed: Dec. 17, 2004

(65) Prior Publication Data

US 2006/0134487 A1    Jun. 22, 2006

(51) Int. Cl.
*H01M 8/04* (2006.01)
*H01M 8/00* (2006.01)

(52) U.S. Cl. .......... 429/512; 429/515; 429/400
(58) Field of Classification Search .......... 429/400, 429/512, 515
See application file for complete search history.

(56) References Cited

U.S. PATENT DOCUMENTS

| | | | |
|---|---|---|---|
| 5,599,638 A | 2/1997 | Surampudi et al. | |
| 6,808,838 B1 * | 10/2004 | Wilson | 429/34 |
| 7,255,947 B2 * | 8/2007 | Becerra et al. | 429/13 |
| 7,407,721 B2 * | 8/2008 | Ren et al. | 429/13 |
| 2004/0209136 A1 | 10/2004 | Ren et al. | |
| 2004/0209154 A1 | 10/2004 | Ren et al. | |
| 2005/0130009 A1 * | 6/2005 | Hasegawa et al. | 429/34 |
| 2007/0087234 A1 | 4/2007 | Wang et al. | |

FOREIGN PATENT DOCUMENTS

WO    WO 2004/093231 A2    10/2004

OTHER PUBLICATIONS

C. Lim, et al. "Development of high-power electrodes for a liquid-feed direct methanol fuel cell" Journal of Power Sources 113 (2003), pp. 145-150.
Lim and Wang, High Performance Electrode Fabrication for Direct Methanol Fuel Cells, 201st Electrochemical Society Meeting, May 2002, Philadelphia, PA, US.
Kim, Sumner, Harrison, Riffle, McGrath, and Pivovar, Direct Methanol Fuel Cell Performance of Disulfonated Poly(arylene ether benzonitrile) Copolymers, Journal of the Electrochemical Society, 151 (12) A2150-A2156 (Dec. 2004).

* cited by examiner

*Primary Examiner* — Karie O'Neill Apicella
(74) *Attorney, Agent, or Firm* — John K. Pike; Law Office of John K. Pike, PLLC

(57) ABSTRACT

A direct methanol fuel cell unit is provided with a fuel cell including an anode, a cathode with a hydrophobic microporous layer, an electrolyte membrane put in-between, and a fuel supply path supplying fuel to the anode. The fuel supply path is provided with an upwind water barrier preventing back-diffusion of water and a gas flow path channeling gas generated at the anode and disposed between the barrier and the anode. A water-rich zone is formed between the water barrier and the cathode microporous layer. Water loss from either side of this zone is eliminated or minimized, thereby permitting direct use of highly concentrated methanol in the fuel flow path with good fuel efficiency and power performance. The cell unit can be applied equally well to both an active circulating air cathode and an air-breathing cathode.

25 Claims, 6 Drawing Sheets

METHODS TO CONTROL WATER FLOW AND DISTRIBUTION IN DIRECT METHANOL FUEL CELLS

FIELD OF THE INVENTION

The present invention relates to a direct methanol fuel cell (DMFC) and a fuel cell system therewith, and, more particularly, to a DMFC operating on concentrated methanol at an anode thereof and a fuel cell system therewith.

BACKGROUND OF THE INVENTION

In general, a fuel cell is provided with a membrane electrode assembly ("MEA" hereinafter) having an anode, a cathode and an electrolyte membrane having proton conductivity put therebetween. In a case of a direct methanol fuel cell ("DMFC" hereinafter), methanol/water solution is supplied to the anode as a fuel and air is supplied to the cathode as an oxidant. The DMFC need not be provided with a reformer for extracting hydrogen from the fuel; thereby it is advantageous in view of downsizing thereof.

The electrolyte membrane has a function of exchanging ions between the cathode and the anode and is necessary to be humidified with water. In general, the water for humidifying is either supplied on the anode side or produced from an oxygen reduction reaction on the cathode side.

It is known that the methanol partly permeates the electrolyte membrane from the anode to the cathode and such methanol is called "crossover methanol". The crossover methanol reacts with oxygen at the cathode and causes reduction in fuel utilization efficiency and a counter electromotive force so that the power generation of the fuel cell is suppressed.

It is important to properly regulate the concentration of methanol inside the anode. An Excessively high concentration leads to a generation of a large amount of the crossover methanol and hence reduction of the power generation. Moreover, in an extreme case, the excessively concentrated methanol may deteriorate the MEA. On the contrary, excessively low concentration leads to shortage of fuel for the power generation.

The water-methanol mixture regulated in a proper concentration in advance may be stored in a fuel tank. However, in this case, a relatively large fuel tank is necessary. Water may be recovered from the water generated at the cathode and admixed with the methanol so as to be a proper concentration. In this case, concentrated methanol may be stored in the fuel tank so that a relatively small capacity of the fuel tank gives a large energy density. However, additional devices for recovering water are necessary. These conventional practices destroy the advantage of DMFC, namely feasibility of downsizing.

SUMMARY OF THE INVENTION

The present invention is intended to overcome the above problems and achieves a DMFC system operated directly on concentrated methanol solution by proper control of water flow and distribution inside the fuel cell, without external recovery of cathode water. A key feature of the present invention is to confine abundant water inside a region between the anode flow path and cathode catalyst layer, even with circulating air through a cathode flow channel. This is realized, on one side, by using a cathode microporous layer (MPL) which is made highly hydrophobic so that the product water can be pushed back into the anode through a thin membrane. On the other side of the region, namely on the outside of the anode flow path, a water barrier is inserted, which contains a number of elongated holes or pores in a plate of metals, polymers, or ceramics. This barrier has a unique property that it allows liquid flux only in the direction from the fuel flow path into the anode flow path. Back-diffusion of water in the reverse direction is essentially eliminated. The barrier is thus termed "upwind" water barrier. When the cell is under current, the consumption in the anode catalyst layer and crossover through the membrane of methanol and water will cause a strong liquid flow through these holes/pores toward the anode flow path, thereby creating an effect that the downstream does not influence the upstream. This upwind effect virtually eliminates any escape of water from the downstream (inside the water-rich zone) to the upstream (in the fuel flow path). Therefore, the upwind water barrier and the cathode MPL effectively protect water from escaping and hence maintain a constantly water-rich zone in the vicinity of the anode catalyst layer and membrane. The presence of this water-rich zone inside the fuel cell enables the use of concentrated fuel directly with good fuel efficiency and cell performance.

According to an aspect of the present invention, a fuel cell is provided with an anode, a cathode, an electrolyte membrane put between the anode and the cathode, an anode flow path capable of channeling gas generated at the anode and being layered on the anode, an upwind water barrier having resistance against back-diffusion of water into the fuel flow path, and a cathode MPL to promote water back flow into the anode.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features.

DETAILED DESCRIPTION OF THE INVENTION

Figure 1:
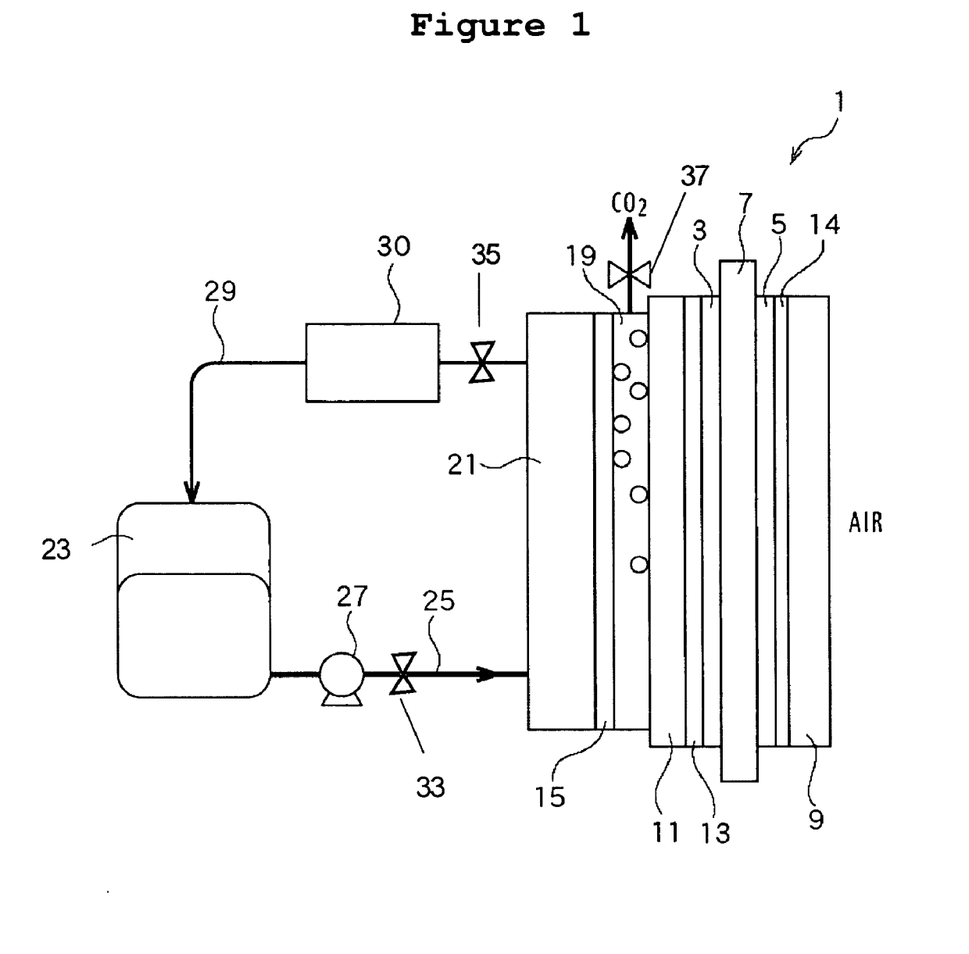
FIG. 1 is a schematic illustration of a fuel cell system according to a first embodiment of the present invention.

Referring to FIG. 1, a fuel cell system 1 according to a first embodiment of the present invention is provided with a MEA having an anode catalyst layer 3, a cathode catalyst layer 5 and an electrolyte membrane 7 having proton conductivity put therebetween.

The anode catalyst layer 3 is for oxidizing a fuel (a methanol aqueous solution) and hence extracting electrons and protons therefrom. The anode catalyst layer 3 is provided with an anode gas diffusion layer 11 disposed adjacent thereto, made of carbon paper for example.

The cathode catalyst layer 5 is for oxygen reduction where electrons provided with a cathode gas diffusion layer 9 disposed adjacent thereto react with the protons generated at the anode catalyst layer 3 to form water at the cathode catalyst layer 5.

The electrolyte membrane 7 is made of any ion-exchange materials having proton conductivity. A preferable example thereof is a copolymer of tetrafluoroethylene and perfluorovinyl ether sulfonate and more preferably "Nafion" as a tradename (DuPont Corp.) can be exemplified.

A conventional configuration can be applied to the MEA and, therefore, further detailed description will be omitted.

The cathode gas diffusion layer 9 made of porous carbon cloth or carbon paper is layered on an outer surface of the cathode catalyst layer 5, opposite to the electrolyte membrane 7, and exposed to outside air. The cathode gas diffusion layer 9 is processed with a hydrophobicity treatment so as to be hydrophobic for increasing a hydrostatic pressure by a capillary force.

The anode gas diffusion layer 11 made of porous carbon cloth or carbon paper is layered on a surface of the anode catalyst layer 3, opposite to the electrolyte membrane 7. The anode gas diffusion layer 11 is processed with a hydrophilicity treatment so as to be hydrophilic.

At the anode catalyst layer 3 and the cathode catalyst layer 5, following reactions respectively progress.

(Anodic Reaction)

$$CH_3OH + H_2O \rightarrow CO_2 + 6H^+ + 6e^- \quad (1)$$

(Cathodic Reaction)

$$3/2 O_2 + 6H^+ + 6e^- \rightarrow 3H_2O \quad (2)$$

Provided that liquid having a volume $V_1$ occupies a space having a volume V in a porous body, a saturation s of liquid is defined as:

$$s = V_1/V \quad (3)$$

Provided that a porous body is hydrophilic, a capillary force $P_c$ in the porous body is represented by an equation:

$$p_c = \sigma \cos\theta_c \left(\frac{\varepsilon}{K}\right)^{1/2} [1.417(1-s) - 2.120(1-s)^2 + 1.263(1-s)^3] \quad (4)$$

Figure 2:
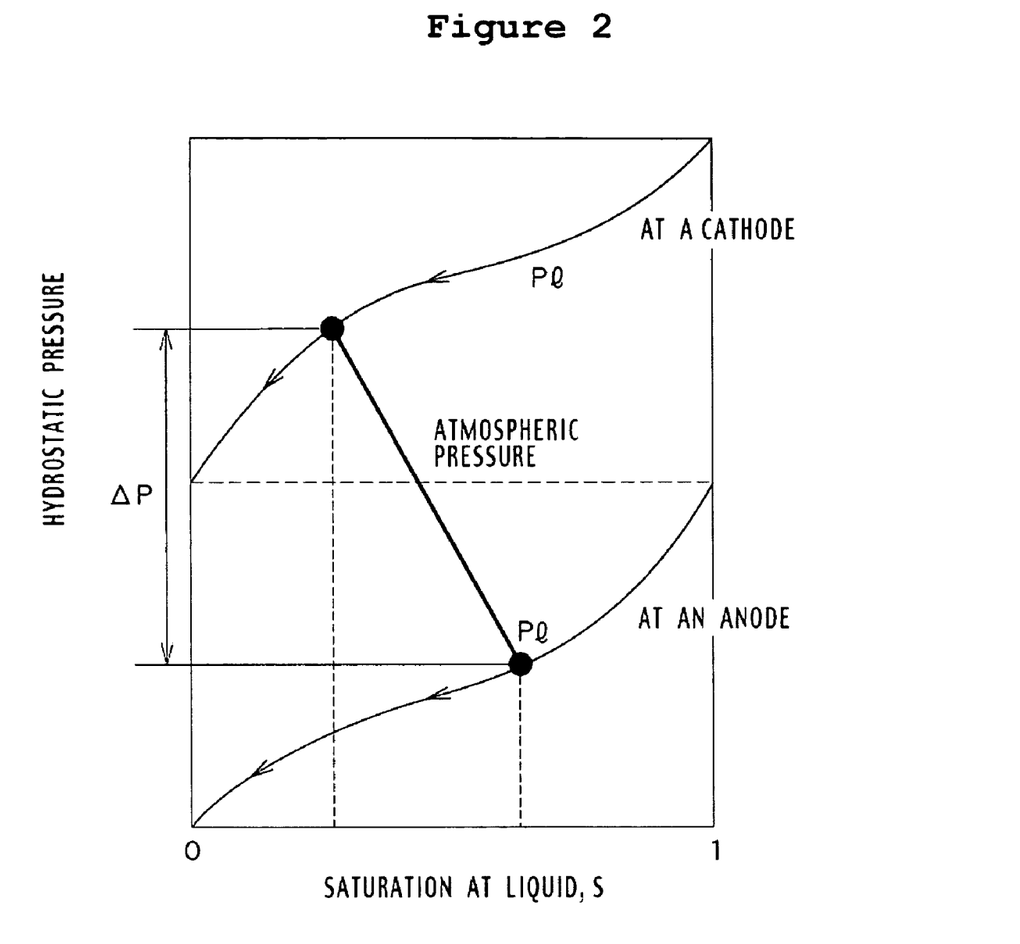
FIG. 2 is a graph showing a relation between a saturation of liquid and a hydrostatic pressure.

If hydrophobic, the capillary force $P_c$ is:

$$p_c = \sigma \cos\theta_c \left(\frac{\varepsilon}{K}\right)^{1/2} [1.417s - 2.120s^2 + 1.263s^3] \quad (5)$$

where $\sigma$ is a surface tension of the liquid, $\theta_c$ is a contact angle of the liquid, $\varepsilon$ is a voidage of the porous body and K is a permeability to the porous body. In a case where $\sigma$, $\theta_c$, $\varepsilon$ and K are given, the hydrostatic pressure by the capillary force can be represented as a function of the saturation s of liquid as shown in FIG. 2. As being understood from FIG. 2, the hydrostatic pressure is kept equal to or lower than the atmospheric pressure in a hydrophilic porous body and kept equal to or higher than the atmospheric pressure in a hydrophobic porous body.

In the aforementioned constitution, when $CO_2$ is generated at the anode catalyst layer 3 by the anodic reaction (1), the saturation s of liquid at the anode catalyst layer 3 goes below 1. When water is generated at the cathode catalyst layer 5 by the cathodic reaction (2), the saturation s of liquid at the cathode catalyst layer 5 goes beyond 0. Furthermore, as mentioned above, the anode gas diffusion layer 11 is hydrophilic and the cathode gas diffusion layer 9 is hydrophobic, thereby the capillary force in the cathode gas diffusion layer 9 is made higher than the capillary force in the anode gas diffusion layer 11.

Differential water pressure ΔP induced by the capillary force difference between the cathode gas diffusion layer 9 and the anode gas diffusion layer 11 provides driving force of transporting the water generated at the cathode catalyst layer 5 in part to the anode catalyst layer 3. The transported water can be utilized to result in the water-rich zone at the anode catalyst layer 3.

The net transport of water across the electrolyte membrane 7 includes transfer accompanying with protons transfer from the anode catalyst layer 3 to the cathode catalyst layer 5 ("water drag" hereinafter), diffusion and hydraulic permeation driven by the differential water pressure. The diffusion is driven by a difference in water content through the ion-exchanging membrane 7. As described above, the differential hydrostatic pressure is induced by the capillary force differentiated by the hydrophilic anode gas diffusion layer 11 and the hydrophobic cathode gas diffusion layer 9 and hence transports the water from the cathode catalyst layer 5 to the anode catalyst layer 3 as mentioned above. Namely, the hydraulic permeation driven by the differential water pressure transfers the water from the cathode catalyst layer 5 to the anode catalyst layer 3, though saturation of water is lower at the cathode catalyst layer 5 than at the anode catalyst layer 3.

Flux of the water drag is represented by an equation:

$$J_{drag} = n_d \frac{I}{F} \quad (6)$$

where $n_d$ is a number of water molecules per a proton accompanying with the proton, I is a current and F is a Faraday's constant. $n_d$ is about 2.5 in a case of a Nafion membrane.

Flux of the water diffusion driven by the concentration gradient is represented by an equation:

$$J_{w,mem} = \frac{\rho_{mem} D_{mem}^{H_2O} (\lambda_c - \lambda_a)}{EW \delta_{mem}} \quad (7)$$

where λ is a water content $[H_2O]/[SO_3^-]$ accompanying with the sulfonate group, which is the ion-exchanging group of Nafion, EW is a molar equivalent, δ is a thickness of the Nafion membrane, D is a diffusion constant of water in Nafion and ρ is a density of Nafion. λ is about 22 when Nafion comes in contact with liquid water, and about 14 when Nafion comes in contact with saturated water vapor.

Flux of the water transport is represented by an equation:

$$J_l = \frac{\rho_{mem}K_{mem}}{\mu_{mem}\delta_{mem}}\left[\sigma_a\cos\theta_a\left(\frac{\varepsilon_a}{K_a}\right)^{1/2}J(s_{m/a}) + \sigma_c|\cos\theta_c|\left(\frac{\varepsilon_c}{K_c}\right)^{1/2}J(1-s_{m/c})\right] \quad (8)$$

where $J(s)=1.417(1-s)-2.120(1-s)+1.263(1-s)^3$ and $\mu$ is a viscocity. The subscript "mem" represents electrolyte membrane. The subscripts "a" and "c" respectively represent anode and cathode. The subscript "m/a" represent a boundary between the electrolyte membrane and the anode and the subscript "m/c" represent a boundary between the electrolyte membrane and the cathode.

Reducing pore sizes of the porous body so as to reduce permeability of water and increasing water-repellency of the porous-body are preferable to increase the hydrostatic pressure at the cathode. On the other hand, the air or oxygen is necessary to be supplied to the cathode catalyst layer 5. Consequently, a cathode micro-porous layer 14 made of water-repellency treated carbon having sub-micron pore sizes and a thickness of several tens μm is interposed between the cathode catalyst layer 5 and the cathode gas diffusion layer 9. Thereby, an increase in the hydrostatic pressure can be consistent with sufficient air supply to the cathode catalyst layer 5.

To suppress methanol crossover, the Nafion membrane having a thickness of about 150 μm is applied to conventional DMFCs. However, as being understood from the equation (8), the Nafion membrane is preferably made thinner to facilitate water transport driven by the capillary force difference. Test results have shown that the net water coefficient through the membrane according to the present invention can be reduced to zero or even negative by using Nafion 1135 or thinner membranes, even with circulating air through a cathode flow channel. The membrane thickness should be equal to or thinner than 3.5 mil or 90 μm.

Figure 4:
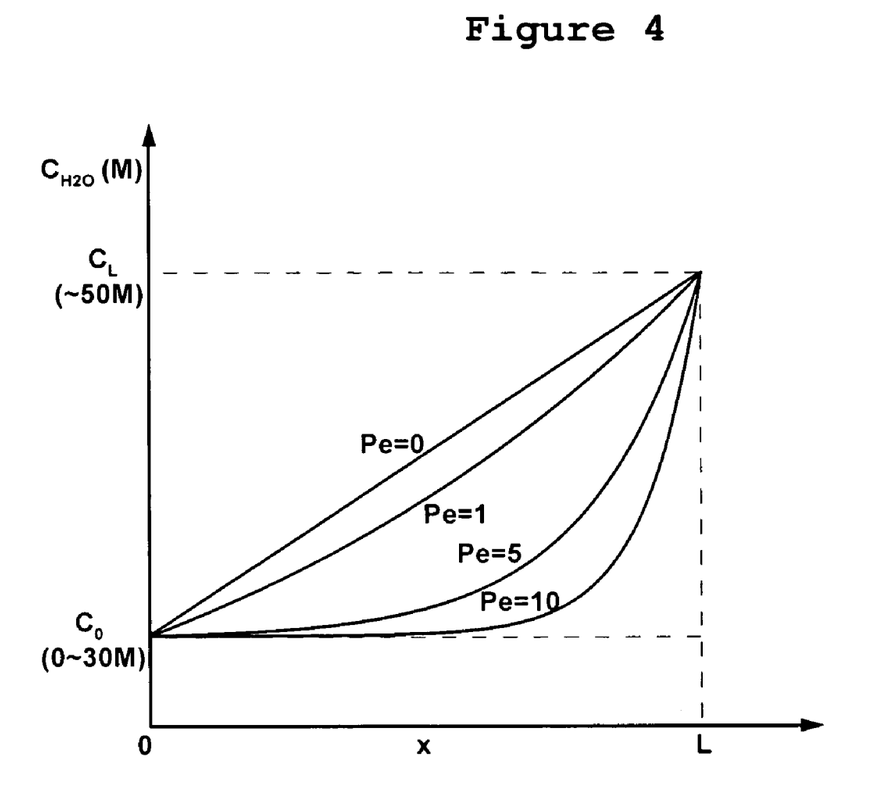
FIG. 4 is a graph showing a concentration distribution of water inside the water barrier.

To maintain a water-rich zone in the anode so as to mitigate methanol crossover through the membrane and fuel loss, an anode flow path 19 is further layered on an outer side of the anode gas diffusion layer 11 with the upwind water barrier 15. The water barrier 15 has much resistance against back-diffusion of water. Provided that water diffuses from the anode flow path 19 to the fuel flow path 21, a problem of increase in methanol concentration in the anode flow path 19, may emerge. The water barrier 15 prevents the diffusion of the water from the anode flow path 19 to the fuel flow path 21 and hence makes it possible to maintain a constantly low methanol concentration in the anode flow path 19. The water barrier 15 is preferably made of a series of holes regularly or randomly patterned in a plate of chemically stable and corrosion-resistant materials. Consequently, the liquid velocity through the holes, induced by methanol and water supply into the anode catalyst layer when the cell is under current, becomes sufficiently fast. This will lead to a dimensionless number (i.e. Peclet number), defined as $u_1L_{WB}/D_{H2O}$, on the order of 10 and higher. Here $u_1$ is the liquid velocity through the holes in the water barrier, $L_{WB}$ the thickness of the water barrier, and $D_{H2O}$ the water diffusion coefficient in liquid. Once Peclet number reaches 10, a situation called "upwind" results, in which the downstream of the barrier, i.e. inside the anode flow path, does no longer influence the upstream which is located in the anode fuel flow path. FIG. 4 plots the water concentration profile inside the water barrier for various Peclet numbers. As can be seen, at the Peclet number of 10, the gradient in water concentration at the mid-point of the barrier vanishes, thereby indicative of zero back-diffusion of water into the fuel flow path. Such a water barrier effectively protects water from being escaped into the fuel supply with high methanol concentration. The water barrier 15 makes it possible to keep a state where a water concentration in the fuel flow path is kept between, for example, 0 and 30 M when a water concentration in the anode flow path 19 is 50 M.

Specifically, the liquid velocity through the water barrier is calculated from materials balance at the anode catalyst layer, namely $$u_l = \frac{1}{S}\frac{I}{\rho_l 6F}[M^{MeOH}(1+\beta) + M^{H2O}(1+\alpha)] \quad (9)$$

where S is the open area ratio of the water barrier 15, I the operating current density, $\rho_l$ the methanol/water solution density, F Faraday's constant (96,487 C/mol), $M^{MeOH}$ the molecular weight of methanol (i.e. 32 g/mol), and $M^{H2O}$ the molecular weight of water (i.e. 18 g/mol). $\beta$ is the ratio of crossover methanol to methanol consumed at the anode for power generation. $\alpha$ is the number of water molecules per proton migrating through the polymer membrane. Evidently, the first and second terms on the right hand side of Equation (9) represent the methanol and water losses from the anode catalyst layer, respectively, once the cell is under current. This means that the liquid flow through the water barrier is activated by electrochemical reactions and current flow through the membrane.

The anode flow path 19 is configured to channel $CO_2$ generated by the anodic reaction. The anode flow path 19 uses a buoyant force by gravity or internal pressurization to exhausting $CO_2$ outward. The anode flow path 19 carries off $CO_2$ from the anode catalyst layer 3 so that the anodic reaction at the anode catalyst layer 3 is promoted. Water and methanol concentrations in the anode flow path 19 are kept substantially constant by means of an agitation effect caused by transfer of the $CO_2$ gas.

In the case that the water barrier is made of electrically conducting materials, there are contacts between the water barrier 15 and the anode gas diffusion layer 11 to enable current collection from the cell. In the case that the water barrier 15 is made of electrically insulating materials, the water barrier will be housed inside an electrically conducting metal grid, mesh or frame to collect electric current from the anode gas diffusion layer. A metal current collector (not shown in FIG. 1) is placed on the outside of the cathode gas diffusion layer 9 in order to collect electric current from the cathode side as known to those skilled in the art. The electricity can be obtained between the anode and cathode current collectors.

In the above constitution, the fuel flow path 21, the water barrier 15, the anode flow path 19, the anode gas diffusion layer 11, the anode micro-porous layer 13 and such form a fuel supply path for supplying the fuel to the anode catalyst layer 3 of the fuel cell 1. A fuel pump 27 is disposed on a link flow path 25 interconnecting between the fuel tank 23, which stores a highly concentrated fuel (50 through 100% methanol, for example), and the fuel flow path 21. The fuel flow path 21 and the fuel tank 23 are further connected via a recovery flow path 29 so as to recover unreacted methanol from the fuel flow path 21. A radiator 30 may be disposed on the recovery flow path 29.

Figure 3:
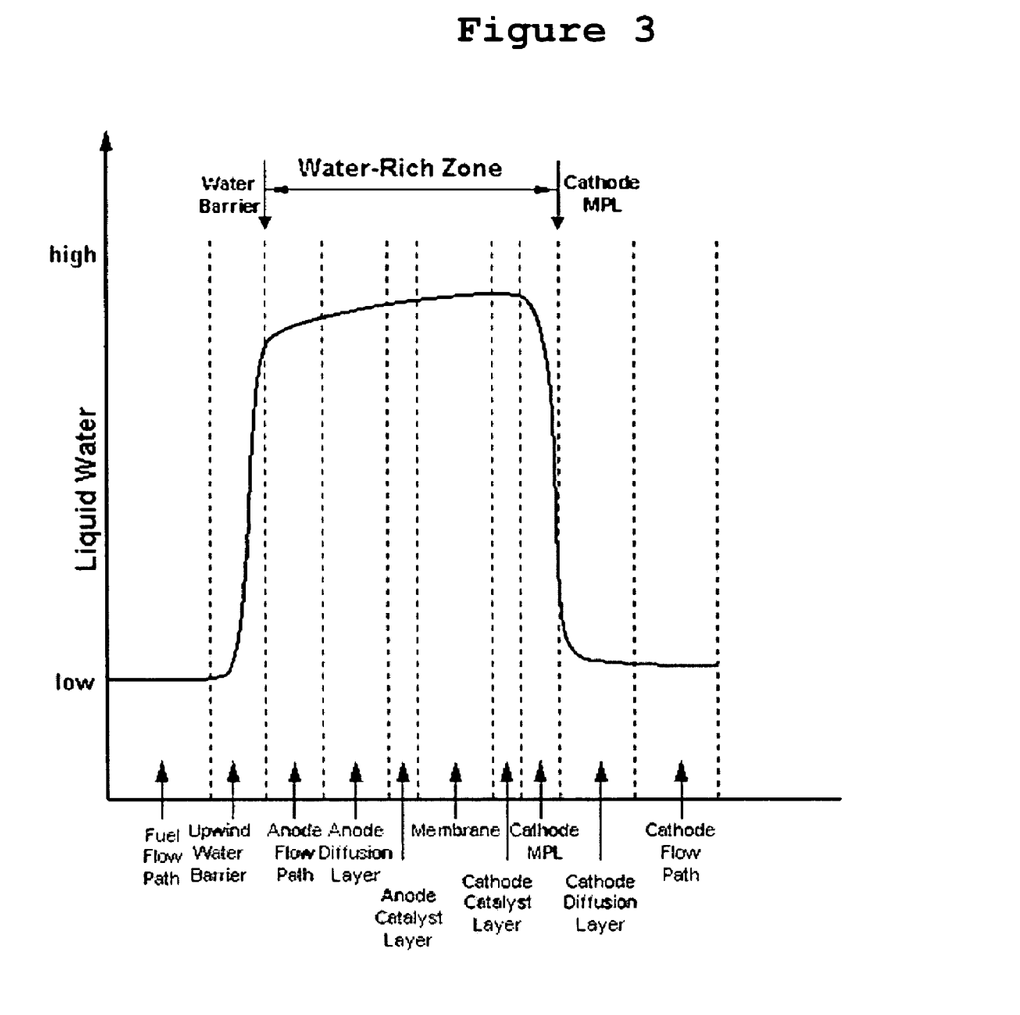
FIG. 3 is a schematic illustration of liquid water distribution and water-rich zone with respect to a structure of the fuel cell.

According to the above constitution, $CO_2$ generated at the anode catalyst layer 3 by the anodic reaction is exhausted from the anode flow path 19 outward by gravity and/or internal pressurization and the water generated at the cathode catalyst layer 5 by the cathodic reaction is partly transferred to the anode catalyst layer 3 by the capillary force and utilized to dilute the methanol supplied to the anode catalyst layer 3. A distribution of water concentration in the fuel cell 1 is schematically shown in FIG. 3.

On the other hand, the highly concentrated fuel (50 through 100% methanol, for example) supplied from the fuel tank 23 to the fuel flow path 21 penetrates through the water barrier 15 into the anode flow path 19 and the anode gas diffusion layer 11. The water barrier 15 suppresses back-diffusion of the water from the anode flow path 19 to the fuel flow path 21. Namely, the water barrier 15 keeps concentration of the fuel in the fuel flow path 21 high.

The anode micro-porous layer 13 modestly restricts the fuel to penetrating from the anode gas diffusion layer 11 into the anode catalyst layer 3. Thereby the fuel reaching the anode catalyst layer 3 is further diluted with the water transferred from the cathode gas diffusion layer 9 to the anode catalyst layer 3 by the capillary force. Namely, the fuel is regulated to be in a proper concentration. Meanwhile, excessive fuel at the fuel flow path 21 is recovered via the recovery flow path 29 to the fuel tank 23.

As being understood from the above description, according to the present embodiment, the fuel supplied from the fuel tank 23 to the fuel flow path 21 is kept in a constant concentration because the interposed water barrier 15 suppresses the back-diffusion of the water from the anode flow path 19 thereto. The methanol in the anode catalyst layer 3 is mixed with the water transferring from the cathode micro-porous layer 14 and then regulated in an appropriately low concentration. Based on the aforementioned function, the present embodiment allows the highly concentrated fuel to be housed in the fuel tank 23.

Therefore the fuel tank 23 can be miniaturized as compared with a case where beforehand diluted methanol aqueous solution having a concentration of about 3 M is stored therein, or larger power generation capacity can be obtained provided that the fuel tank is not miniaturized. Moreover, the water generated at the cathode catalyst layer 5 is moved by means of a capillary force difference and utilized to dilute the fuel so as to be a proper concentration without any additional device therefor so that the whole constitution can be simplified and hence miniaturized.

A gas-liquid separation membrane 37 may be provided at ends, through which $CO_2$ is exhausted, of the anode flow path 19. The anode flow path 19 can exhaust $CO_2$ in a case where the fuel cell system 1 is oriented to an arbitrary direction.

This cell design can self start or shut-down. During start-up when a load is applied, the concentrated methanol solution is delivered to the anode fuel path 21 by opening the inlet valve 33 and the outlet valve 35 and by operating the liquid pump 27, and subsequently to the anode flow path 19 by the liquid flow through the water barrier 15 under action of electrochemical consumption. The cell will then gradually reach a steady state under a constant load. Upon shut-down, the liquid pump 27 is reversely operated and liquid in the fuel path 21 is pumped back into the fuel tank. Then the inlet valve 33 and outlet valve 35 are closed and the liquid pump is stopped.

In the aforementioned constitution, flux of the methanol supplied to the anode catalyst layer 3 is represented by an equation:

$$J_{CH3OH} = (1 + \beta) \frac{1}{6F} \quad (10)$$

where β is a ratio of crossover methanol crossing to methanol contributing to the power generation. Because 1 mole of methanol generates 6 moles of protons and 6 moles of electrons by the anodic reaction (1), flux of methanol necessary to generate a current I is equal to a value of the current I divided by 6F. Flux of methanol crossing over is β times the flux contributing to the power generation. Total flux is the sum of the both fluxes, therefore the equation (10) is obtained. Moreover, flux of the water supplied to the anode catalyst layer 3 is represented by an equation:

$$J_{H2O} = (1 + 6\alpha) \frac{I}{6F} \quad (11)$$

where α is a number of water molecules per a proton penetrating the electrolyte membrane 7. "1" described in the bracket corresponds to an amount of water consumed in the anodic reaction (1). Molar ratio of water to methanol supplied to the anode catalyst layer 3 is:

$$J_{H2O}:J_{CH3OH} = (1+6\alpha):(1+\beta) \quad (12)$$

Namely, it is equal to a ratio of (1+a proportion of water penetrating to the cathode):(1+a proportion of methanol crossing over). Provided that a ratio of water to methanol of the methanol aqueous solution stored in the fuel tank is regulated to be equal thereto in advance, the concentration of the methanol aqueous solution is steadily kept constant from the fuel tank 23 through the fuel flow path 21. Thereby one-pass fuel supply can be enabled. In a case where the fuel circulates from the fuel flow path 21 to the fuel tank 23, the concentration of the methanol aqueous solution in the fuel tank 23 is kept constant. For example, for β=0.2 (20% fuel crossover) and α=0.4, Equation (12) yields the molarity of 11 M in the fuel supply.

Figure 5:
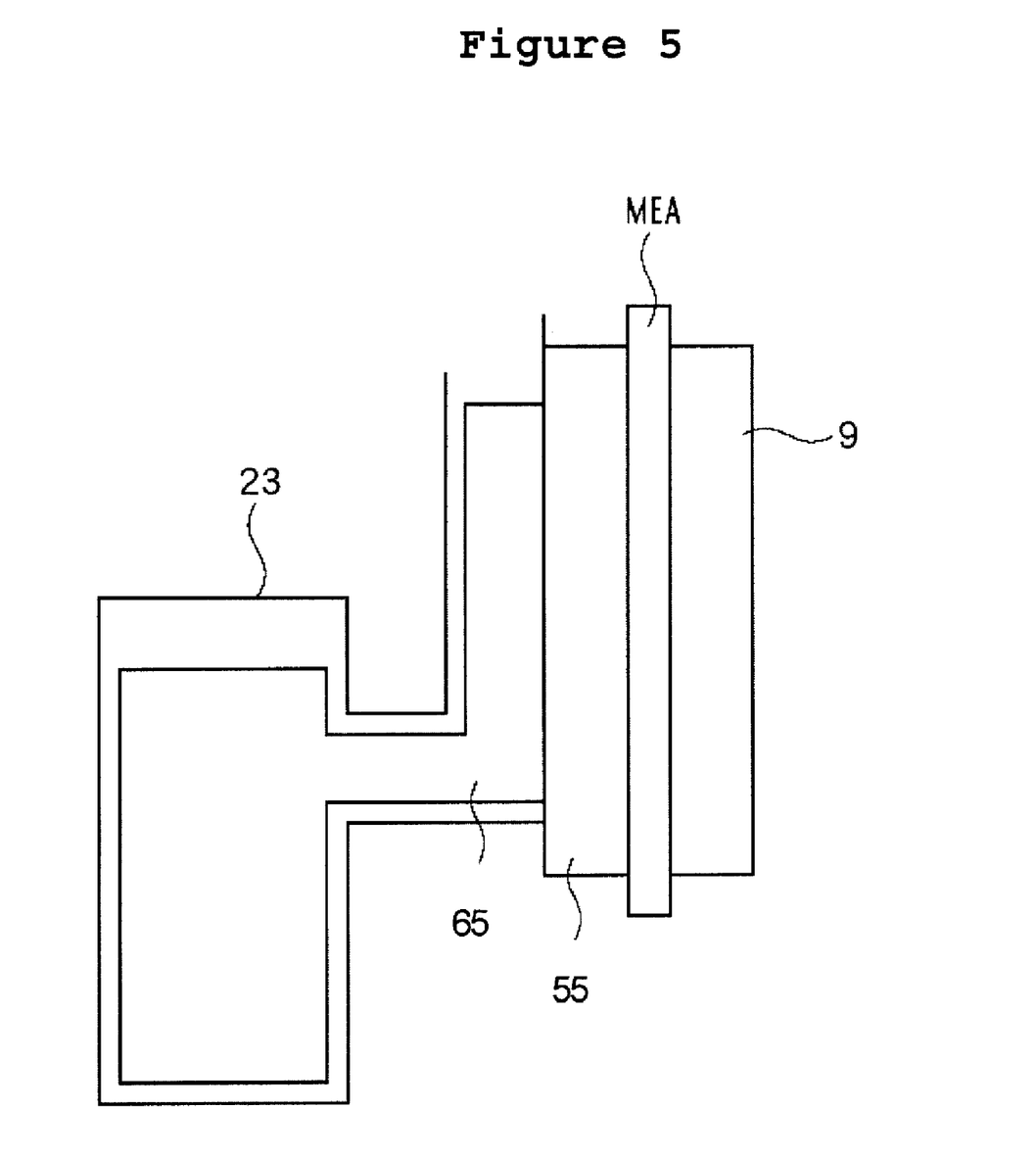
FIG. 5 is a schematic illustration of a fuel cell system according to a second embodiment of the present invention.

A second embodiment of the present invention will be described hereinafter with reference to FIG. 5. In the following description, substantially the same elements as the aforementioned first embodiment are referenced with the same numerals and the detailed descriptions are omitted. In FIG. 5, the anode catalyst layer 3, cathode catalyst layer 5 and the electrolyte membrane 7 are represented as a membrane electrolyte assembly (MEA). Furthermore, the anode gas diffusion layer 11, the anode micro-porous layer 13, the water barrier 15, and the anode flow path 19 are represented as a unitary body of an assembly body 55.

According to the second embodiment, a porous body 65 is disposed between the fuel tank 23 and the assembly body 55 and the link flow path 25 and the fuel pump 27 are omitted.

Therefore the present embodiment takes substantially the same effects as the aforementioned first embodiment which allow the highly concentrated fuel to be housed in the fuel tank and the link flow path 25 and the fuel pump 27 can be omitted so that the whole constitution can be simplified.

Figure 6:
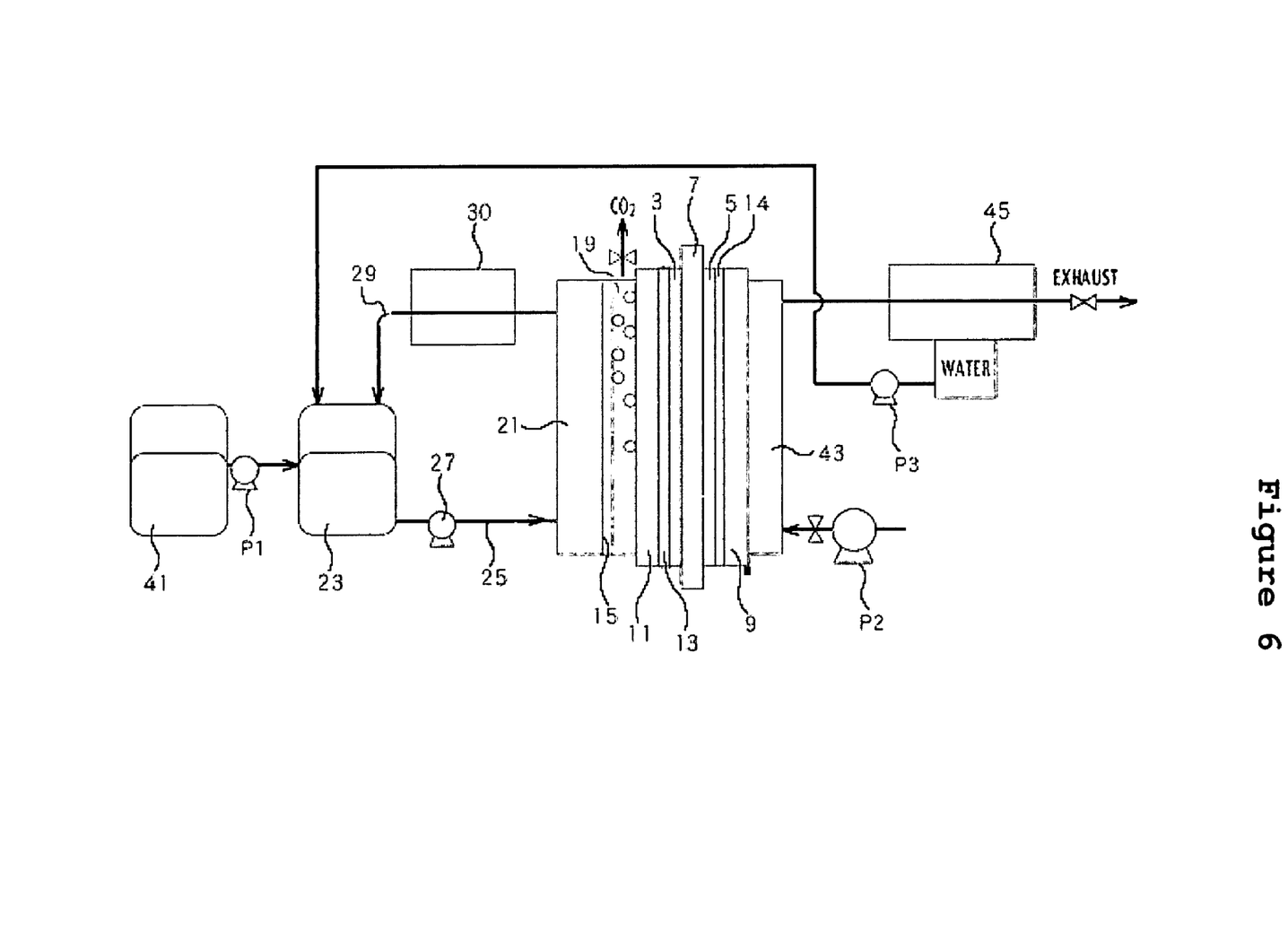
FIG. 6 is a schematic illustration of a fuel cell system according to a third embodiment of the present invention.

A third embodiment of the present invention will be described hereinafter with reference to FIG. 6. In the following description, substantially the same elements as any of the aforementioned embodiments are referenced with the same numerals and the detailed descriptions are omitted.

According to the present embodiment, a tank 41 stores a highly concentrated methanol and the concentrated methanol is supplied to the tank 23 by means of a pump P1. Furthermore, air is supplied to a cathode flow path 43 layered on an outer side of the cathode diffusion layer 9 and exhaust gas in the cathode flow path 43 is cooled at a condenser 45 so as to condense water vapor contained in the exhaust gas. The condensed water by means of the condenser 45 is recovered to the fuel tank 23 by means of a pump P3.

According to the present embodiment, provided that the concentration of the methanol aqueous solution stored in the fuel tank 23 varies in some degree, a variation of the concentration at the anode catalyst layer 3 can be suppressed because the water barrier from the fuel tank 23 through the anode catalyst layer 3 is relatively much.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A fuel cell comprising:
   an anode;
   a cathode;
   an electrolyte membrane put between the anode and the cathode;
   an anode flow path capable of channeling gas generated at the anode and being layered on the anode; and
   an upwind water barrier having resistance against back-diffusion of water and being layered between the anode flow path and a fuel flow path,
   said fuel flow path supplying fuel to the anode through the water barrier and the anode flow path.

2. The fuel cell of claim 1, wherein:
   the water barrier comprises porous or perforated materials.

3. The fuel cell of claim 1, further comprising:
   a gas-liquid separation membrane at one or more ends of the anode flow path.

4. The fuel cell of claim 1, wherein:
   the anode comprises an anode catalyst layer disposed adjacent to the electrolyte membrane; an anode gas diffusion layer disposed adjacent to the anode flow path; and an anode microporous layer being disposed between the anode catalyst layer and the anode gas diffusion layer.

5. The fuel cell of claim 1, wherein:
   the electrolyte membrane comprises a hydrophilic layer adjacent to the anode and a hydrophobic layer adjacent to the cathode.

6. The fuel cell of claim 1, wherein:
   the cathode comprises a cathode catalyst layer disposed adjacent to the electrolyte membrane, a cathode gas diffusion layer and a cathode microporous layer being disposed between the cathode catalyst layer and the cathode gas diffusion layer.

7. The fuel cell of claim 1, wherein:
   the fuel comprises methanol and water mixed in a water-to-methanol molar ratio of $(1+6\alpha):(1+\beta)$, where $\alpha$ is a number of water molecules per a proton penetrating the electrolyte membrane and $\beta$ is a ratio of methanol crossing over to the cathode to methanol contributing to the power generation.

8. The fuel cell of claim 1, wherein:
   the thickness of the electrolyte membrane is equal or thinner than 90 micrometer.

9. A fuel cell system comprising:
   an anode;
   a cathode;
   an electrolyte membrane put between the anode and the cathode;
   an anode flow path capable of channeling gas generated at the anode and being layered on the anode;
   an upwind water barrier having resistance against back-diffusion of water and being layered between the anode flow path and a fuel flow path;
   said fuel flow path supplying fuel to the anode through the water barrier and the anode flow path; and
   a fuel tank for storing the fuel.

10. The fuel cell system of claim 9, wherein:
    the cathode is exposed to outside air.

11. The fuel cell system of claim 9, wherein:
    the cathode and the anode are configured so as to utilize water generated at the cathode in part to dilute the fuel.

12. The fuel cell system of claim 9,
    wherein when fuel is stored in the fuel tank, the fuel comprises methanol and water mixed in a water-to-methanol molar ratio of $(1+6\alpha):(1+\beta)$, where $\alpha$ is a number of water molecules per a proton penetrating the electrolyte membrane and $\beta$ is a ratio of methanol crossing over to the cathode to methanol contributing to the power generation.

13. The fuel cell system of claim 9, further comprising:
    a recovery flow path connecting the cathode and the fuel tank so as to recover water generated at the cathode to the fuel tank.

14. The fuel cell system of claim 9, wherein, when said fuel cell system is in operation, the water concentration in the vicinity of the anode catalyst layer is over 20 M greater than the water concentration in the fuel tank.

15. The fuel cell system of claim 9, wherein the anode flow path channels $CO_2$ gas generated at the anode.

16. The fuel cell of claim 1, wherein the anode flow path channels $CO_2$ gas generated at the anode.

17. A fuel cell system comprising:
    an anode;
    a cathode;
    an electrolyte membrane between the anode and the cathode;
    an anode flow path capable of channeling gas generated at the anode and being layered on the anode;
    an upwind water barrier having resistance against back-diffusion of water and being layered between the anode flow path and a fuel flow path;
    a fuel tank for storing a fuel; and
    a porous body which transports the fuel to the anode through the water barrier and the anode flow path, the porous body connecting the fuel tank and the anode.

18. The fuel cell system of claim 17, wherein:
    the cathode is exposed to outside air.

19. The fuel cell system of claim 17, wherein:
    the cathode and the anode are configured so as to utilize water generated at the cathode in part to dilute the fuel.

20. The fuel cell system of claim 17, wherein:
    wherein when fuel is stored in the fuel tank, the fuel comprises methanol and water mixed in a water-to-methanol molar ratio of $(1+6\alpha):(1+\beta)$, where $\alpha$ is a number of water molecules per a proton penetrating the electrolyte membrane and $\beta$ is a ratio of methanol crossing over to the cathode to methanol contributing to the power generation.

21. The fuel cell system of claim 17, further comprising:
a recovery flow path connecting the cathode and the fuel tank so as to recover water generated at the cathode to the fuel tank.

22. The fuel cell system of claim 17, wherein when said fuel cell system is in operation, the water concentration in the anode catalyst layer is over 20 M greater than the water concentration in the fuel tank.

23. The fuel cell of claim 1, wherein the fuel is a liquid.

24. The fuel cell system of claim 9, wherein the fuel is a liquid.

25. The fuel cell system of claim 17, wherein the fuel is a liquid.

* * * * *